Dec. 9, 1958 G. W. QUAST ET AL 2,863,565
SCUM PIPE REVOLVING MECHANISM
Filed Aug. 20, 1956
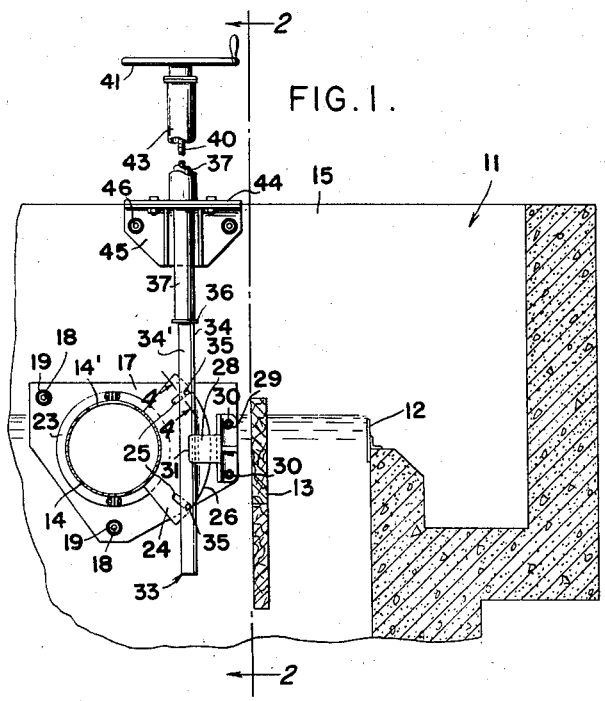
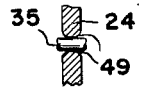
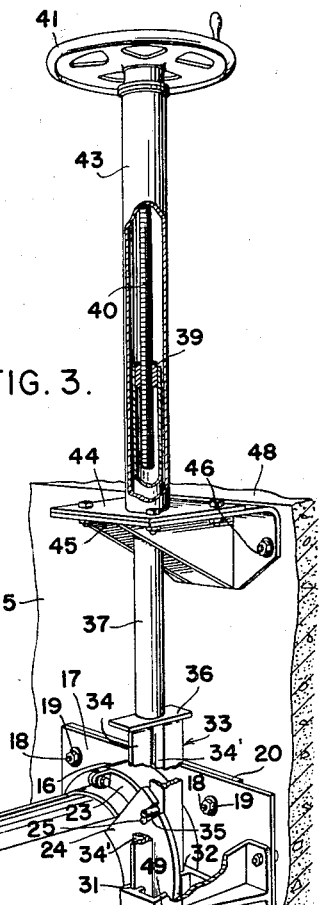
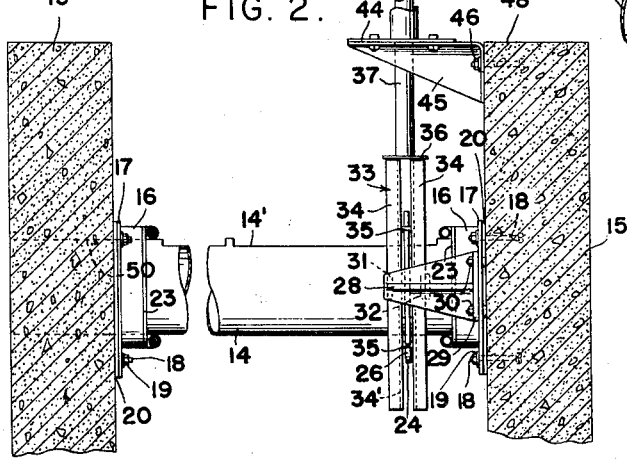
*INVENTORS*
GILBERT W. QUAST
TOM J. KOESKE
BY
*George A. Evans*
ATTORNEY United States Patent Office
2,863,565
Patented Dec. 9, 1958

2,863,565

SCUM PIPE REVOLVING MECHANISM

Gilbert W. Quast, Brookfield, and Tom J. Koeske, Milwaukee, Wis., assignors to Chain Belt Company, Milwaukee, Wis., a corporation of Wisconsin Application August 20, 1956, Serial No. 605,167

4 Claims. (Cl. 210—540)

This invention relates to apparatus for operating scum pipes of the type which are employed in liquid-holding basins to skim grease and other floatable material which collects at the top of the liquid in such basins. These pipes are usually provided with a slot or other opening in their upper portion and by revolving the pipe so that the lip of the slot is submerged, the desired amount of liquid and scum can be decanted into the pipe. The pipes are usually journalled in supports mounted on the side walls of the basin and an opening is usually provided in one of the walls communicating with the interior of the pipe to convey the scum and liquid decanted with it from the pipe.

Heretofore it has been the practice to revolve such scum pipes by means of a hand lever mounted on the pipe and extending upwardly near one end thereof where it may be operated by a man standing alongside the basin. Where less effort and finer adjustment of the degree of submergence of the skimming lip is desired, a worm wheel has been mounted on the pipe and is actuated by a worm gear on a shaft extending upwardly to a similar position. Examples of these two forms of operating mechanisms are shown in U. S. Patent No. 2,337,859, issued December 28, 1943, on an application of our co-worker Frank G. Stuller, and also U. S. Patent No. 2,369,911, issued February 20, 1945, on an application filed jointly by Frank G. Stuller and A. C. Lind. Float controlled, automatic operation of a skimming pipe is shown in prior Patent 2,455,338 of A. C. Lind, issued November 30, 1948.

It is an object of this invention to provide manually operable mechanism for revolving a scum pipe, which is much easier to operate and more precise than the levers heretofore employed and which is considerably cheaper and otherwise superior to the worm and worm gear devices referred to above.

Another object of this invention is to provide apparatus which is simple to mount or install in the field where the best of equipment for aligning parts is not always available.

A further object of the invention is to provide apparatus that will not be affected by corrosion of parts submerged in the liquid in which the scum is collected. Accordingly, material can be employed which is cheaper than that which is specially resistant to corrosion.

The invention as herein illustrated resides in providing a bracket which may be secured to the flange portion of the socket journalling one end of the scum pipe. This bracket is provided with guide means spaced from that end of the bracket which is secured to the pipe socket. The pipe is provided with an outwardly extending plate having slots extending inwardly from its outer edge in a direction radial with respect to the axis of rotation of the pipe. These slots are arranged to be engaged seriatim by pins extending between the legs of a bifurcated rack member or clevis which straddles the plate and is itself confined by the guide means of the bracket. The clevis extends upwardly alongside the freeboard and is moved up and down, as desired, by a hand wheel fitted to a floor stand having a non-rising stem. The stem is threaded and engages a lifting stem secured to the upper end of the bifurcated rack member. The rack is prevented from turning with the stem by its engagement with the aforesaid guide means.

The invention is illustrated in the accompanying drawings depicting a preferred form for embodying the same wherein:

Fig. 1 is the side elevation of a portion of a liquid-holding basin showing the scum pipe in section and one side of the apparatus for operating the same;

Fig. 2 is a side elevation looking parallel to the side walls of the tank taken on the line 2—2 of Fig. 1;

Fig. 3 is a perspective view of the apparatus shown in Figs. 1 and 2; and

Fig. 4 is an enlarged section taken on line 4—4 of Fig. 1.

According to the drawings, the liquid from which the scum is to be removed is collected in the basin 11 which is provided with the well-known effluent weir 12 at the discharge end of the tank. The liquid enters at the opposite end of the tank and flows in the direction indicated by the arrow in Fig. 1. By the time it reaches the effluent end, the scum and other floatable matter has had an opportunity to rise to the surface. Accordingly the scum removing apparatus is generally arranged at the discharge end of the tank, although it may be located in other parts, if desired. A short distance forward of the weir 12 is a baffle 13 which extends slightly above the top of the weir, thereby causing the liquid to have to flow under the baffle and preventing scum from passing over the effluent weir.

The scum pipe 14 extends between the two side walls 15 of the basin and is provided with the slotted portion 14' exposing the interior of the pipe and making it more or less trough shaped. The pipe is arranged so that the center is substantially below the water level and also so that both of the edges of the slot may at the same time be above the top of the weir 12. Hence, by oscillating the pipe in either direction, skimming may occur.

The ends of the pipe are journalled in the sockets 16 which are provided with the flanges 17 arranged parallel to the faces of the walls 15. The bolts 18 which are embedded in the concrete walls 15 extend through suitable apertures in the flange 17 and the latter are retained on the bolts by the nuts 19. Preferably a piece of plywood board 20 is arranged between the socket flange 17 and the concrete wall 15 to seal the same, the said plywood being compressible and thereby fitting any irregularities there might be in the concrete surface.

Preferably the sockets 16 are recessed to provide clearance and to accommodate sealing means as shown in U. S. Patent No. 2,369,911 heretofore mentioned. This accommodates misalignment which may occur between the pipe 14 and the socket 16. Abutting against the end of the sealing means and the pipe socket is the set collar 23 which is firmly clamped around the pipe and retains the seal against axial movement from its location within the socket.

Further out on the pipe from the end that fits in the socket just described is a pinion plate 24 which is welded, or otherwise secured, to the pipe. Plate 24 is provided with the notches 25 which extend from the outer end of the plate 26 radially inwardly with respect to the axis of rotation of the pipe.

The bracket 28 has a flange portion 29 at one end which lies flat against the flange 17 of the pipe socket and is fastened thereto by the bolts 30. The outer end of the bracket is provided with guide members 31 and 32 which face each other and each of which constitutes a groove for guiding the flanges of the rack movement as hereinafter described.

The rack 33 consists of the two angle irons 34 arranged with parallel flanges 34' connected by the guide pins 35 which engage the notches 25. The parallel flanges 34' of the members 34 are spaced sufficiently to accommodate the plate 26 therebetween. The other flanges of the members 34 extend between the respective guides 31 and 32 restricting the movement thereof to a linear direction.

The upper ends of the members 34 are connected by the plate 36 which in turn is connected to the pipe stem 37. Thus the members 34, 36 and 37 constitute a clevis for moving the pinion plate. At its upper end the stem 37 has a threaded plug or lifting stem 39 which engages the threaded stem 40 on which the hand wheel is secured.

The mechanism described above is supported on the control stand 43 which rests on the feet 44 mounted on the bracket 45 which is secured as by the bolts 46 to the wall 15 of the basin. Thus, the rack clevis which operates the scum pipe is supported on a control stand 43 with the end wheel 41 sufficiently above the freeboard 48 to make it readily accessible to the operator.

The apparatus as shown can be rotated through an arc of approximately 150 degrees, making it possible to skim the liquid from either side of the pipe 14. This is desirable even though the pipe is near one end of the tank, for if the scum is allowed to collect, without ever being removed from between the pipe and the baffle 13, the scum may get stiff and interfere with the operation of the pipe. To facilitate moving the pipe through the necessary angle of rotation, there are two slots 25 in the plate 24 and two pins 35 connecting the leg portions of the clevis 37. The notches 25 are spaced apart so that as one pin engages a notch, the other pin becomes disengaged to prevent any binding of the parts.

Because of the possibility, heretofore mentioned, of the pipe 14 being eccentric or having its axis angularly disposed with respect to the socket 16, the plate 24 may be somewhat non-parallel to the legs 34 which are guided in reference to the location of the socket on the side wall of the tank. In order that this misalignment will not cause binding or excessive wear, the edges 49 of the notches may be beveled as illustrated in Fig. 4 with the engaging surfaces of the notch convex in shape.

With apparatus of the type disclosed, it is customary to operate the skimming pipe at periodic intervals, say only once or at the most a few times a day. Normally the pipe 14 is arranged so that the slot 14' is entirely above the water level. Turning the hand wheel 41 in the desired direction will thread or unthread the stem 40 in the nut 39 and lift or lower the rack 33 as desired. Thus, either lip of the slot in the trough can be submerged as much below the surface as desired and the scum collected in the scum pipe. To remove the scum from the pipe, a suitable opening 50 may be provided in the wall 15 communicating with the interior of the pipe 14 to permit the passage of the scum and decanted liquid from the scum pipe.

The invention having been described, what is claimed is:

1. Apparatus for actuating a scum pipe rotatably journalled in a settling basin comprising a bracket having an outer end mounted on the basin and guide means spaced from the outer end of the bracket, a plate secured to the scum pipe having a slot extending from the outer edge of the plate radially inwardly with respect to the axis of rotation of the pipe, a clevis arranged to move rectilinearly within the guide means of said bracket with its leg portions straddling said plate, a pin extending between said leg portions within said slot, and means for moving the clevis back and forth within said guide means to cause oscillation of said scum pipe.

2. Apparatus for actuating a scum pipe rotatably journalled in a settling basin comprising a bracket having an outer end mounted on the basin and guide means spaced from the outer end of the bracket, a plate secured to the scum pipe having a plurality of slots extending from the outer edge of the plate radially inwardly with respect to the axis of rotation of the pipe, a clevis arranged to move rectilinearly while confined within the guide means of said bracket with its leg portions straddling said plate, pins extending between said leg portions arranged to engage said slots seriatim, a lifting stem connected to the clevis for moving the same back and forth within said guide means and threaded means for operating the lifting stem.

3. Apparatus for actuating a scum pipe rotatably journalled in a settling basin comprising a bracket having an outer end mounted on the basin and guide means spaced from the outer end of the bracket, a plate secured to the scum pipe having a slot extending from the outer edge of the plate radially inwardly with respect to the axis of rotation of the pipe, a clevis restricted to rectilinear movement within the guide means of said bracket with its leg portions straddling said plate, a pin extending between said leg portions within said slot, said clevis having a threaded upper portion and threaded means engageable with the threaded portion of the clevis for producing the aforesaid rectilinear motion and accordant rotation of the scum pipe.

4. Apparatus for actuating a scum pipe rotatable journalled in a settling basin comprising a bracket having an outer end mounted on the basin and rectilinearly restricting guide means spaced from the outer end of the bracket, a pinion plate secured to the scum pipe having a tooth engaging portion on one edge of its outer periphery, a rack arranged to move within said guide means while engaging and operating said pinion plate, a rotatable member arranged alongside of the basin having a threaded connection to said rack, and means for rotating said member to cause rectilinear movement of said rack within said guide means and accordant oscillation of said scum pipe.

References Cited in the file of this patent

UNITED STATES PATENTS

| 1,981,310 | Currie | Nov. 20, 1934 |
| 2,337,859 | Stuller | Dec. 28, 1943 |

FOREIGN PATENTS

| 14,732 | Great Britain | 1894 |